United States Patent [19]

Raper

[11] Patent Number: 5,376,275
[45] Date of Patent: Dec. 27, 1994

[54] WASTEWATER TREATMENT

[75] Inventor: William G. Raper, Brighton East, Australia

[73] Assignee: Commonwealth Scientific and Industrial Research Organisation, Campbell

[21] Appl. No.: 776,370
[22] PCT Filed: May 31, 1990
[86] PCT No.: PCT/AU90/00230
 § 371 Date: Jan. 24, 1992
 § 102(e) Date: Jan. 24, 1992
[87] PCT Pub. No.: WO90/15029
 PCT Pub. Date: Dec. 13, 1990

[30] Foreign Application Priority Data

Jun. 1, 1989 [AU] Australia .................. PJ4481

[51] Int. Cl.$^5$ .................................. C02F 3/30
[52] U.S. Cl. ................... 210/605; 210/624; 210/625; 210/903; 210/906
[58] Field of Search .......... 210/605, 630, 903, 906, 210/614, 623, 624, 625, 626

[56] References Cited

U.S. PATENT DOCUMENTS

| | | | |
|---|---|---|---|
| 1,439,406 | 12/1922 | Elrod | 210/605 |
| 2,875,151 | 2/1959 | Davidson | 210/605 |
| 3,166,501 | 1/1965 | Spohr | 210/605 |
| 3,202,285 | 8/1965 | Williams | 210/605 |
| 3,681,236 | 8/1972 | Bergles et al. | 210/605 |
| 3,964,998 | 6/1976 | Barnard | 210/605 |
| 4,874,519 | 10/1989 | Williamson | 210/605 |
| 4,885,093 | 12/1989 | Schoenberger | 210/605 |
| 4,919,815 | 4/1990 | Copa et al. | 210/605 |
| 5,071,559 | 12/1991 | Bleeker | 210/605 |

FOREIGN PATENT DOCUMENTS 0273111 7/1988 European Pat. Off. .
60-132699 7/1985 Japan .
WO8908617 9/1989 WIPO .

OTHER PUBLICATIONS

R. C. Bayly et al, "The Effect of Primary Fermentation on Biological Nutrient Removal", Australian Water and Wastewater Association, 13th Federal Convention, Canberra, Mar. 6-10, 1989; pp. 162-166.

H. A. Nicholls et al, "Improvement to the Stability of the Biological Phosphate Removal Process at the Johannesburg Northernm Works", Biological Phosphate Removal From Wastewaters, ed., R. Ramadori, pp. 261-272 (1987).

T'seyen et al, "Proceedings of International Conference on Management Strategies for Phosphorus in the Environment", Lisbon, Jul. 1-4, 1987, pp. 216-217 and 220.

Korrespondenz Abwasser, vol. 36, No. 3, Mar. 1989, pp. 337-348.

GWF: Das Gas- und Wasserfach, vol. 130, No. 2, Feb. 1989, pp. 49-56.

Primary Examiner—Christopher Upton
Attorney, Agent, or Firm—Birch, Stewart, Kolasch & Birch

[57] ABSTRACT

An activated sludge treatment process is disclosed wherein a sewage sludge component is fermented for a period of at least 15 days to form soluble carbonaceous substrates, the fermented sludge component is contacted with influent sewage to form a conditioned sewage, and the conditioned sewage is supplied to the activated sludge plant.

14 Claims, 2 Drawing Sheets

WASTEWATER TREATMENT

TECHNICAL FIELD

This invention relates to wastewater treatment. The invention is particularly useful in the treatment of raw sewage.

BACKGROUND ART

Modified activated sludge processes have been used for the removal of nitrogen (N) and phosphorous (P), but in many cases the expected performance has not been obtained. Frequently, both N and P levels in treated sewage are found to be many times those encountered in similarly designed plants operating on different sources of sewage.

One well known design of nutrient removal process is the Bardenpho process, described in South African patent application 72/5371 to the South African Inventions Development Corporation (equivalent to U.S. Pat. No. 3,964,998).

For example, this process is known to operate well in one suburb of Johannesburg, but to perform very poorly in another. It has been postulated that sewage deficient in acetic acid, a well known fermentation product, is not suitable as influent to activated sludge plants designed for the removal of P. Therefore attempts have been made to improve the performance of plants by subjecting the influent raw sewage or the settleable portion thereof to fermentation with the objective of generating acetic acid (Barnard 1984).

This procedure has been found to be of assistance. However, the generation of acetic acid is limited by the well known fact that relatively slow growing bacteria are capable of degrading acetic acid to methane. Thus the system has previously been optimised to minimise loss of acetic acid by limiting the mean cell retention time in the pre-fermenter. Mean cell retention time (MCRT) is defined as the average time spent within the system by a cell. In the sewage treatment industry MCRT is usually called "sludge age".

Prior workers have recommended that mean cell retention times be restricted to 5 days or less in order to maximise the production of acetic acid (Nicholls et al. 1987, T'Seyen et al. 1985).

DISCLOSURE OF THE INVENTION

Although the prior recommendations are broadly correct with respect to the generation of acetic acid, we have found that the efficiency of P and/or N removal increases with "soluble" carbonaceous substrate (soluble TOC) in the influent to the activated sludge plant. We have found that longer mean cell retention times (for example, in the range of 10–60 days) are more advantageous with respect to the N and P removal performance of an activated sludge plant such as the Bardenpho plant using sewage pretreated as described.

It is an object of the present invention to provide a process for the control of N and/or P levels in effluent from an activated sludge plant.

Accordingly, in a first aspect, the present invention provides a method of controlling the phosphorous and/or nitrogen level in effluent from an activated sludge treatment plant comprising providing a source of wastewater such as raw sewage, carrying out fermentation of the sludge component of said wastewater for a period exceeding that required for optimal acetic acid production and supplying the resultant product to said activated sludge treatment plant.

Where reference is made herein to a fermentation period required for optimal acetic acid production, we mean that MCRT previously recommended for optimal production, that is, 5 days or less.

A portion of the settled material resulting from the fermentation step of the invention may, if desired, be combined with other settled sewage before being introduced into the activated sludge plant.

Preferably the MCRT is substantially greater than that previously recommended for optimum acetic acid production. More preferably the mean cell retention time is in the range 10–60 days. A cell retention time of about 30 days is particularly preferred.

The activated sludge plant may be a 5 stage Bardenpho plant however, other activated sludge plants may be used. We have found that the level of phosphorous and nitrate in the effluent from a Bardenpho plant fed with raw sewage treated in a pre-fermentation tank fell from 5.3 and 1.5 mg/l respectively at 7 days mean cell retention time in the pre-fermentation tank to as low as 0.2 and 0.7 mg/l respectively at 30 days mean cell retention time. The fermentation step may be carried out in an activated primary tank (Barnard 1984). Sludge recirculation is the preferred system for achieving the desired sludge age as the recycled sludge is elutriated by the fresh sewage fed to the system although alternative means may be employed to achieve the fermentation desired, such as, by separating the said sludge in a settling vessel and subjecting it to fermentation and elutriation in a separate, usually smaller vessel. Fermentation may also be carried out in a gently stirred vessel into which raw sewage is supplied at the bottom of the vessel.

The present invention allows for the control of the phosphorous and/or nitrogen content of the effluent from the modified activated sludge treatment plant in which incoming waste material is subjected to a fermentation step, the MCRT in this step being selected so as to achieve the desired phosphorous and/or nitrogen level in the effluent.

Accordingly, in a further aspect the present invention provides a method of providing a desired phosphorous and/or nitrate level in the effluent from an activated sludge treatment plant comprising carrying out fermentation of wastewater in one or more activated primary tanks or the like and supplying the effluent from said one or more primary tanks to said activated sludge treatment plant, the mean cell retention time in the fermentation step being selected so as to achieve said desired phosphorous and/or nitrate level.

Preferably the activated sludge plant effluent has a phosphorous level below 3 mg/liter. More preferably the phosphorous level is less than 1 mg per liter.

The nitrate level may be below 10 mg/liter. More preferably nitrate level is below 3 mg/liter.

BRIEF DESCRIPTION OF DRAWINGS

In order that the invention may be more readily understood we describe an embodiment of the invention in reference to the accompanying drawings in which:

In FIGS. 2 and 3 the following abbrieviations are used:

| R SL | Returned Sludge from clarifier (not shown) |
|---|---|
| ANAER | Anaerobic stage (absence of oxygen and oxidised nitrogen) |
| ANOX | Anoxic stage (absence of oxygen, oxidised nitrogen usually present) |
| AER | Aerobic stage |

Tanks are numbered clockwise on the assumption that all partitions are in place. In fact only two partitions were used in the first aerobic tank. Hence the anaerobic stage ends at T2, the anoxic stage at T5 and the first aerobic stage at T15.

GENERAL DESCRIPTION OF THE PROCESS

Figure 1:
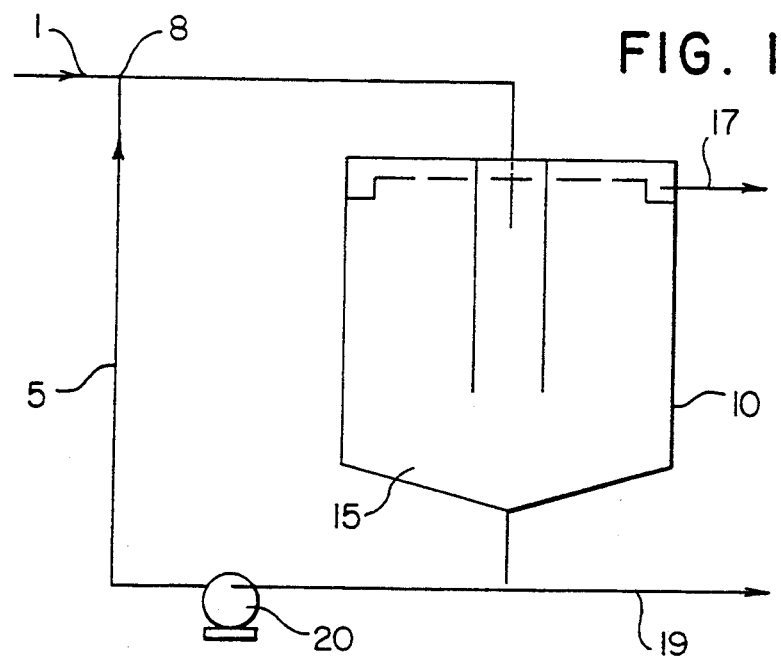
FIG. 1 is a schematic drawing of an activated primary tank used in the embodiment in accordance with the invention.
Figure 2:
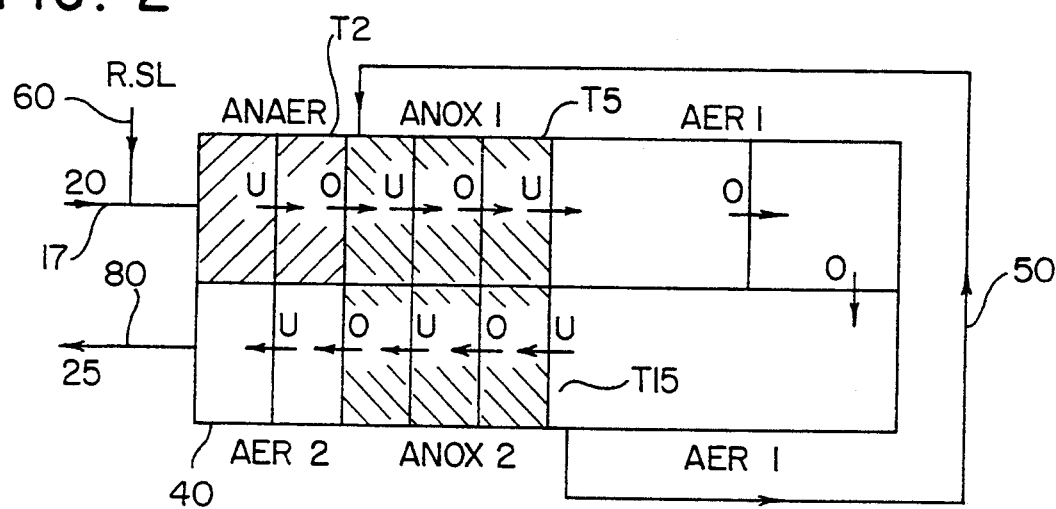
FIG. 2 is a schematic drawing of an activated sludge tank used in the pilot plant described in the example.

Referring generally to FIGS. 1 and 2, in a preferred mode of operation, incoming raw sewage 1 is mixed with recycled sludge 5 either before or after feeding to a fermentation vessel 10 said vessel being provided with a means of transporting 20 the sludge which settles in said vessel from the bottom of the vessel to the mixing point 8. As is well known, alternative means may be employed to achieve the fermentation desired, such as, by separating the said sludge in a settling vessel and subjecting it to fermentation and elutriation in a separate, usually smaller vessel. The size of the vessels used is selected to provide an appropriate fermentation time at the expected rates of input flow. A portion of the sludge 19 is removed from the fermentation vessel and not recycled said proportion being such as to give the desired MCRT. The vessel is also provided with an outlet enabling fermented sewage 19 to pass to an activated sludge sewage treatment plant 40. Further raw sewage may be fed into the activated sludge sewage treatment plant the proportions of raw and fermented sewage being adjusted to ensure that the final effluent contains concentrations of phosphorus and nitrate below the desired levels.

EXAMPLE OF METHOD IN ACCORDANCE WITH INVENTION

Materials and Methods (a) Sewage treated

Raw sewage was obtained from the trunk sewer passing the CSIRO Lower Plenty research station and was fed continuously at constant flow rate to the primary settler of the pilot plant.

(b) Analytical methods

Phosphate as P ($PO_4P$), Total Phosphorous as P (TP), Oxidised Nitrogen (OXN), Ammonia Nitrogen ($NH_3N$), Chemical Oxygen Demand (COD), and Total Kjeldahl Nitrogen (TKN) were determined by Standard Methods (5th edition) or by Hach Kits. Total organic carbon (TOC) was determined using a Beckman TOC Analyzer. Acetate as Acetic acid (AC) was determined by GC (Pilkington 1988).

Pilot Plant Description

Figure 3:
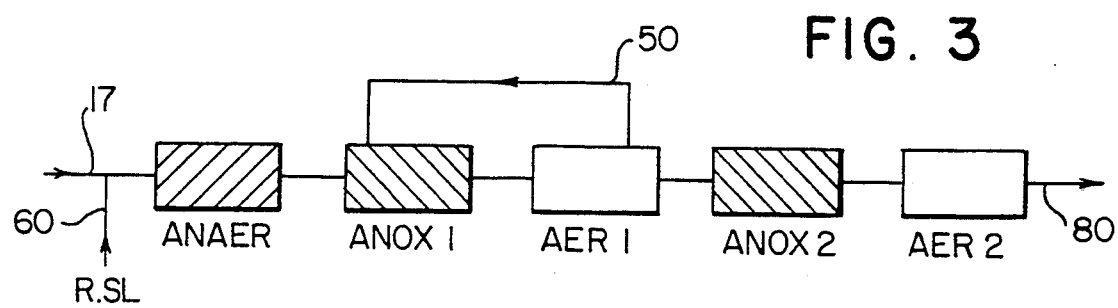
FIG. 3 is a schematic diagram of a 5 stage Bardenpho plant.

Referring again to FIGS. 1 and 2, the main features of the system are a primary settler 10 followed by a rectangular vessel 40 capable of being divided into up to 20 stages and set up as a 5 stage Bardenpho (see FIG. 3), a convention cylindrical secondary clarifier (not shown) fitted with a sludge rake, and associated pumps.

Raw sewage 1 is supplied to a 2 m³ cylindrical "activated primary tank" (APT) 10 fitted with a sludge recirculation pump 20 to allow fermentation of primary sludge if desired. The vessel operates at a rise rate of 0.6 m per hour and a liquid residence time of approximately 1.5 hours. The MCRT (sludge blanket volume/sludge wasted per day) was held at the desired value by wasting 19 a calculated volume each week-day. Twenty four hour composite samples of the raw sewage typically contained 9 mg/l P and 50 mg/l TRN.

Primary settled sewage 17 feed-rate to the 5 m³ activated sludge tank 40 was 3–4 l/min (liquid residence time approximately 1 day). Mixed liquor 50 recycle and return sludge 60 flows were approximately 12 and 3–4 l/min. respectively. The tank configuration used over the period was as shown in FIG. 2. Sludge age was maintained at 30 days by wasting mixed liquor from the first aeration tank (T15) each week-day. The secondary clarifier (not shown) is 1 m in diameter and has a liquid depth of 3 m, thus the rise rate at average flow rate was 0.27 m/hr.

Results

When first commissioned, the APT was operated for several weeks with sludge recycle, but without removal of primary sludge. Initially, sludge volume increased in a predictable fashion, but began to decrease as bacterial action began. After 21 days APT sludge was wasted as required to give a MCRT of approximately 30 days. The Bardenpho unit was commissioned using 2M³ of sludge from the Brushy Creek extended aeration plant of the Melbourne and Metropolitan Board of Works. Enhanced P removal was apparent within a week, and after some months, during which mechanical malfunctions were gradually overcome, two consecutive months of excellent operation were obtained. During this period, 24 hour composite samples of effluent 80 contained levels of $PO_4P$, TP, OXN and $NH_3N$ typically 0.3, 0.4, 2 and 0.3 mg/l respectively.

At the completion of this period, a breakage in the sludge recycle line while the plant was unattended caused loss of all APT sludge. The opportunity was taken to evaluate the effect of APT sludge age on P removal in the Bardenpho unit. Initially, sludge was allowed to accumulate without recirculation, the tank being desludged each week-day. P removal remained good for over a week, but then deteriorated until effluent $PO_4P$ levels rose and stabilised at 3–5 mg/l.

Sludge recirculation was recommenced, and the system was operated for periods at different APT MCRT. Operation was continued for at least 4 times the APT MCRT before changing to the next sludge age selected. Unexpectedly, no significant improvement in performance of the Bardenpho unit was apparent at the APT MCRTs of 3–5 days presently considered optimum.

Over the period, results show that a trend of performance improvement occurred as MCRT in the APT increased. This is summarised in Table 1, which compares a series of results for different samples and components, each averaged over particular MCRT periods.

TABLE 1

| | | AVERAGE STREAM ANALYSES (mg/L) v. APT SLUDGE AGE | | | | | | | | | | | |
|---|---|---|---|---|---|---|---|---|---|---|---|---|---|
| | SLUDGE AGE | COMPOSITE RAW SEWAGE | | COMPOSITE | | INFLUENT COD/ | | TANK SPOT SAMPLES | | | | RC SL | COMPOSITE EFFLUENT |
| MONTH | D | COD | STOC | COD | TKN | TKN | TOC | T2 STP | T5 OXN | T15 STP | T15 OXN | OXN | TP | OXN |
| OCT | 30 | | | 222 | 54 | 4.1 | | 11 | .75 | <1 | 2.8 | .4 | <1 | .5 |
| NOV | 5 | | | 127 | 36 | 3.5 | | 10 | 1.3 | 3.3 | 3.3 | 1.5 | 4.3 | 1.5 |
| DEC | 3 | | | 174 | 39 | 4.5 | | 15 | .8 | 3.9 | 2.7 | .6 | 5.3 | 1 |
| DEC | 7 | | | 260 | 31 | 8.4 | | 20 | 1.2 | 4.3 | 3.4 | .9 | 3.7 | 1.5 |
| JAN | 7 | | | 269 | 42 | 6.4 | | 14 | 2.6 | 4.3 | 3.8 | 1.5 | 5.3 | 1.5 |
| FEB | 15 | 467 | | 262 | 47 | 5.6 | | 9.1 | 3.9 | 5 | 5.2 | 3 | 5.4 | 3 |
| APR | 21 | 328 | | 324 | 63 | 5.1 | 95 | 19 | 3.3 | 3.6 | 7.9 | 4.2 | 4.1 | 4.2 |
| APR | 30 | 531 | 72 | 339 | 67 | 5.1 | 117 | 18 | 1.6 | 2.4 | 7.7 | 3.8 | 3.8 | 3.8 |
| MAY* | 30 | 383 | 87 | 315 | 65 | 4.8 | 89 | 14 | 1.8 | 3.7 | 7.7 | 2.8 | 5.1 | 2.8 |
| JUN | 30 | 336 | 81 | 314 | 60 | 5.2 | 113 | 18 | .5 | 1.7 | 2.7 | .7 | 2.3 | .7 |
| JUL | 30 | 408 | 69 | 434 | 65 | 6.7 | 98 | 17 | 1.1 | <1 | 4.7 | .3 | <1 | 1.4 |

Abbreviations
TKN Total Kjeldahl Nitrogen
COD Chemical Oxygen Demand (sample mixed)
STP Soluble Total Phosphorous
OXN Oxidised Nitrogen
STOC Settled Total Organic Carbon (sample settled for 1 hr, supernatant analysed)
RC SL Recycled Sludge
*Considerable problems were encountered in maintaining sludge recirculation in the APT during May, circulation usually being lost overnight due to pump and line blockages. It is likely that improved reliability obtained in June was responsible for the improved results shown.

Figure 4:
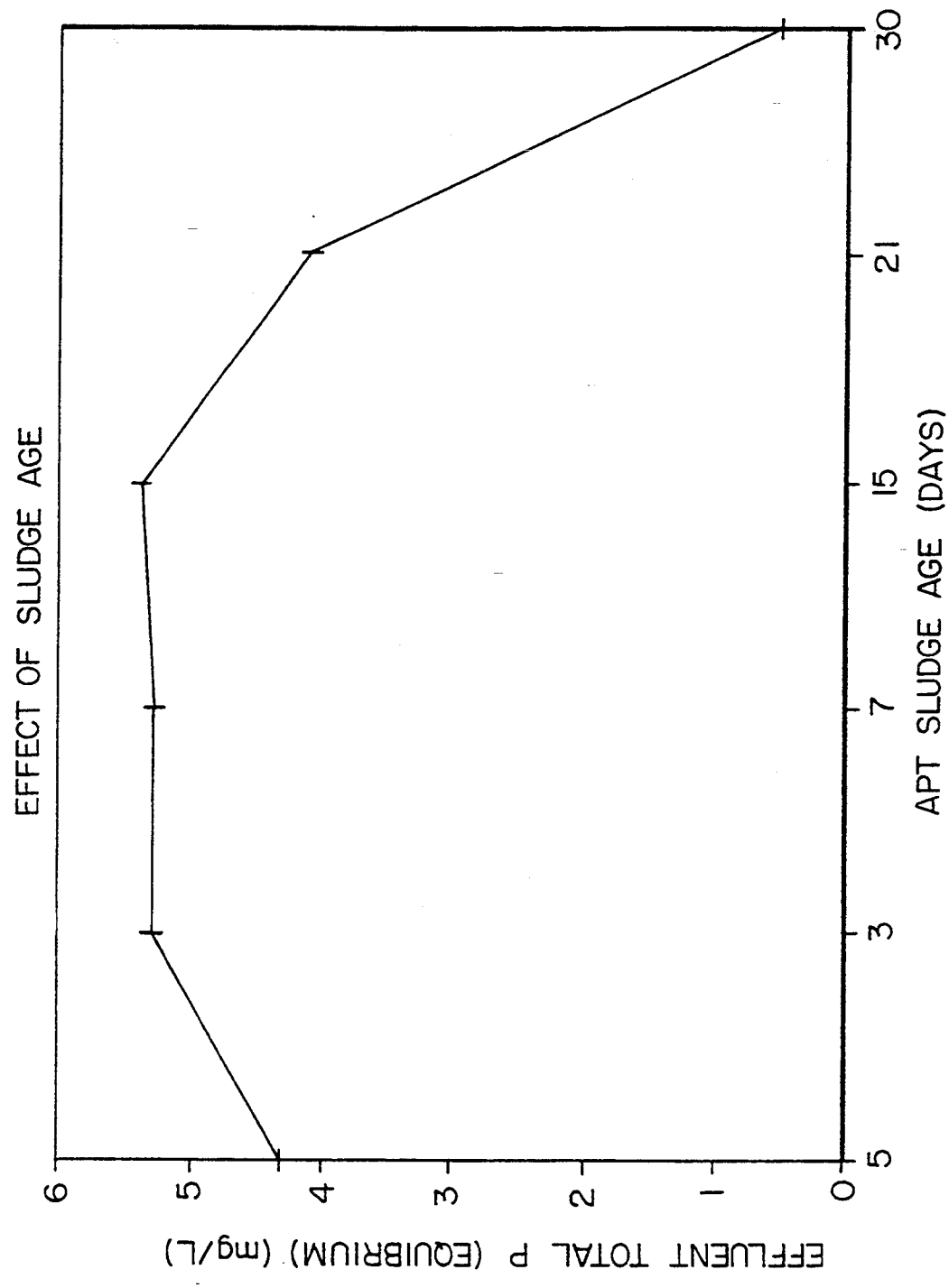
FIG. 4 is a graph showing the effluent phosphate levels from a Bardenpho system at equilibrium operation (after greater than four MCRT's running).

As shown in FIG. 4, there is a significant reduction in system effluent total P content when the MCRT in the Activated primary treatment (APT) step is greater than that required for optimum acetic acid production. As can be seen from FIG. 4, a significant improvement in total P removal occurs when the MCRT in the primary fermenter is greater that about 15 days. It will also be seen from FIG. 4 that a desired total P level in the effluent can be achieved by selecting an appropriate MCRT in the APT.

Although the invention has been described in reference to the particular embodiment described above, it will be clear that various modifications may be made without departing from the spirit and scope of the present invention.

REFERENCES

Barnard, J. L. (1984) Activated primary tanks for phosphate removal. Water S. A. Vol. 10 No. 3, July, pp 121–126.

Nicholls, H. A., Osborn, D. W. and Pitman, A. R. (1987). Improvements to the stability of the biological phosphate removal process at the Johannesburg Northern Works. Biological Phosphate Removal from Wastewaters, e.d. R. Ramadori. Pergamon, Oxford.

T'Seyen, J., LeFlohic, P., Faup, G. M., Megank, M. and Block, J. C. (1985). A separate acetate producing reactor to improve biological phosphorus removal. Proceedings of International Conference on Management Strategies for Phosphorus Environment, Lisbon 1–4 July, Selper London, UK.

I claim:

1. In an activated sewage sludge treatment process for treating sewage at an activated sludge treatment plant, the improvement comprising the sequential steps of:
  a) fermenting a sewage sludge component for a period of at least 15 days under conditions to maximize the formation of soluble carbonaceous substrates in said sludge component;
  b) contacting said fermented sludge component with influent sewage to form a conditioned sewage, said conditioned sewage containing soluble carbonaceous substrates elutriated from said fermented sludge component; and
  c) supplying said conditioned sewage to said activated sludge treatment plant;

wherein the phosphorous level in an effluent from the sludge treatment plant is at a level below 3 mg/liter and the nitrate level in said effluent is at a level below 10 mg/liter.

2. In the process of claim 1, wherein said period in step (a) is in the range of about 15 days to 60 days.

3. In the process of claim 2, wherein said period in step (a) is in the range of about 21 days to 60 days.

4. In the process of claim 3, wherein said period in step (a) is about 30 days.

5. In the process of claims 1, 2, 3 or 4, wherein the conditioned sewage is mixed with sewage, or a settleable component thereof, just prior to the entry of said sewage into said activated sludge treatment plant.

6. In the process of claim 5, wherein said activated sludge treatment process comprises the following sequential steps of;
  (a) an anaerobic step;
  (b) an anoxic step; and
  (c) an aerobic step.

7. In the process of claim 1, the improvement further comprising subsequent to step (c) thereof, the further sequential steps:
  (iv) a second anoxic step; and
  (v) a second aerobic step.

8. In the process of claim 1, wherein said fermentation step (a) is carried out in one or more fermentation vessels, which vessels are fed with sewage comprising said sludge component;
  wherein each of said fermentation vessels comprises means for recirculating an underflow from the vessels to an influent of said vessels.

9. In the process of claim 8, wherein said recirculated underflow is combined with influent sewage prior to being returned to said fermentation vessel.

10. In the process of claim 1, wherein said fermentation step (a) is carried out on settled sludge in one or more vessels and step (b) is carried out by contacting the fermented sludge with influent sewage in one or more separate vessels.

11. In the process of claim 1, wherein the fermenting step (a) is carried out in a stirred vessel.

12. In the process of claim 1, wherein the phosphorus level in the effluent is less than 1 mg/liter.

13. In the process of claim 1, wherein the nitrate level is less than 3 mg/liter.

14. In an activated sewage sludge treatment process for treating sewage at an activated sludge treatment plant, the improvement comprising the sequential steps of a) fermenting a sewage sludge component for a period of at least 15 days under conditions to maximize the formation of soluble carbonaceous substrates in said sludge component;

b) contacting said fermented sludge component with influent sewage to form a conditioned sewage, said conditioned sewage containing soluble carbonaceous substrates elutriated from said fermented sludge component; and c) supplying said conditioned sewage to said activated sludge treatment plant, said plant comprising an aerobic step in combination with 1) an anaerobic step, 2) an anoxic step, or 3) an anaerobic step and an anoxic step;

wherein the phosphorous level in an effluent from the sludge treatment plant is at a level below 3 mg/liter and the nitrate level in said effluent is at a level below 10 mg/liter.

* * * * *